Figure 1:
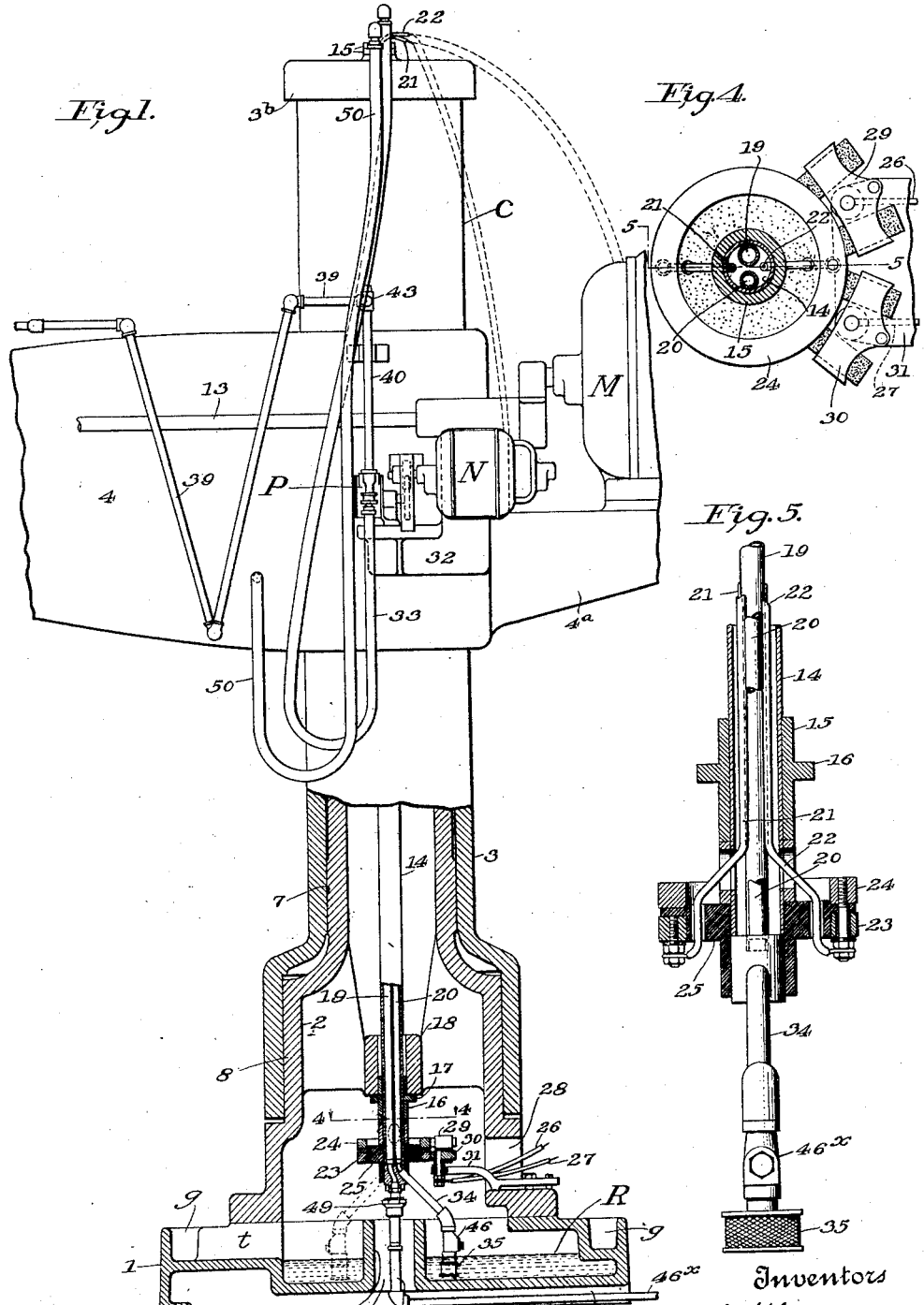

Feb. 14, 1928.

D. C. KLAUSMEYER ET AL 1,658,808

DRILL COLUMN WITH COAXIAL POWER LINE

Filed Oct. 17, 1924　　4 Sheets-Sheet 2

Inventors
David C. Klausmeyer
Victor Juliet
By Attorney
Albert P. Nathan

Feb. 14, 1928.  
D. C. KLAUSMEYER ET AL  
1,658,808  
DRILL COLUMN WITH COAXIAL POWER LINE  
Filed Oct. 17, 1924  
4 Sheets-Sheet 3
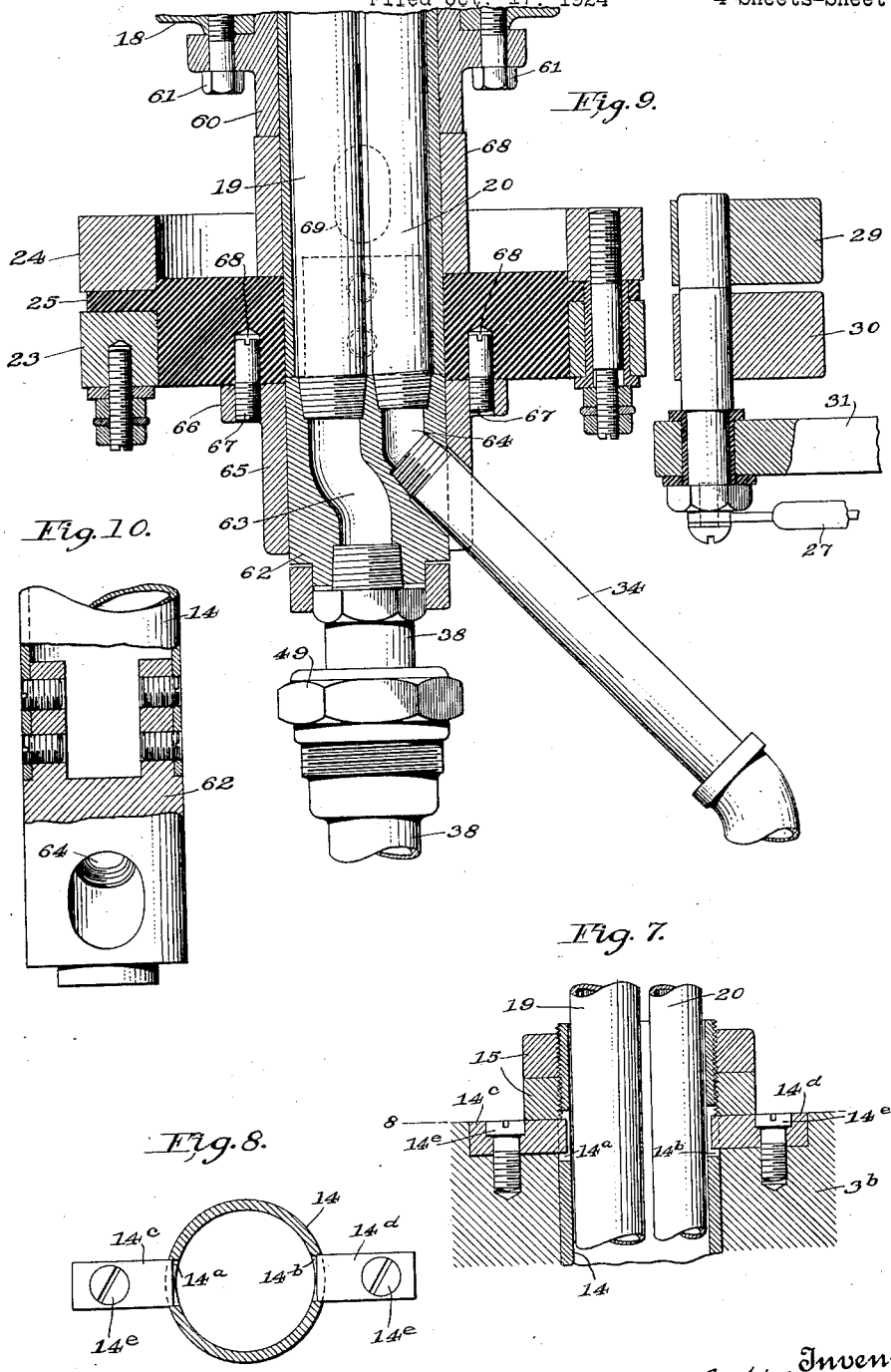

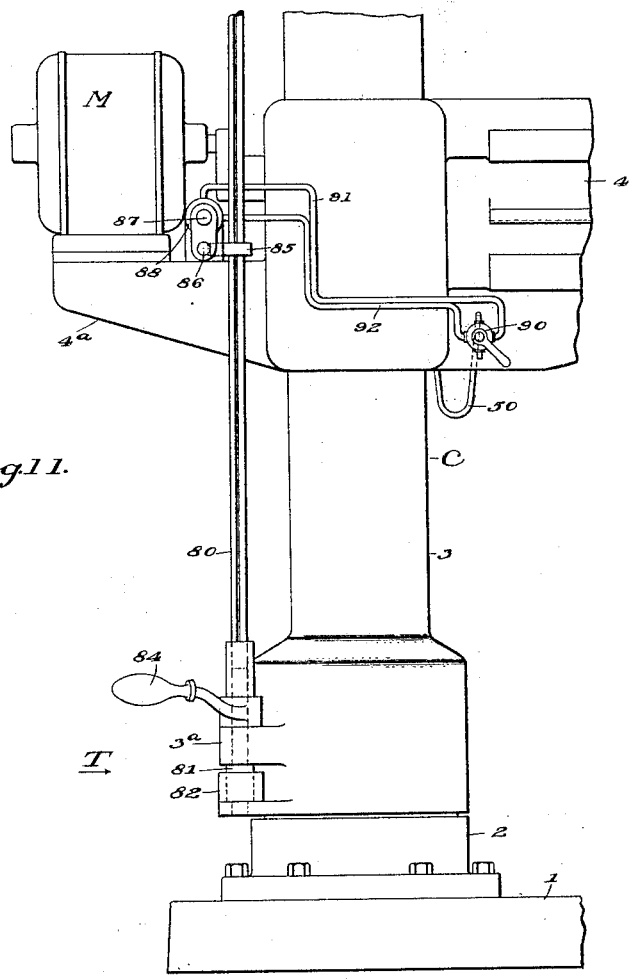

Patented Feb. 14, 1928.

1,658,808

UNITED STATES PATENT OFFICE.

DAVID C. KLAUSMEYER, OF CINCINNATI, AND VICTOR JULIEN, OF NORWOOD, OHIO, ASSIGNORS TO THE CINCINNATI BICKFORD TOOL COMPANY, OF OAKLEY, CINCINNATI, OHIO, A CORPORATION OF OHIO.

DRILL COLUMN WITH COAXIAL POWER LINE.

Application filed October 17, 1924. Serial No. 744,196.

This invention relates to machine-tools and more particularly to means for effecting the introduction and distribution of power to operate the various mechanism thereof and for supplying cutting lubricant to the tool. The invention is particularly adaptable to radial drills and therefore it will be disclosed in connection with that type of machine-tool as illustrating one of its practical embodiments.

Radial drills, as commonly constructed, comprise a base, a two-part column, an arm extending radially from the column and a drill-head slidably mounted on the arm and carrying a drill-supporting spindle. The arm is usually adapted to be moved vertically on a sleeve forming a part of the column and the sleeve with its attached arm may be swung horizontally about the axis of the column. These machine-tools are also provided with means for clamping the sleeve and arm against circular movement about the axis of the column and means for continuously supplying cutting lubricant to the tool.

In a certain type of radial drill the column rises from the center of a long base upon which the work may be secured at opposite sides of the column. In the operation of this type of radial drill one piece of work is secured to the base at one side of the column while another piece is being drilled at the opposite side, the arm being swung horizontally to bring the drill first to one drilling position and then to the other, thus the arm is swung in a complete circle about the axis of the column. This type of radial drill usually has the spindle-driving motor mounted upon an extension of the arm and therefore it moves circularly with the arm. To provide means for lubricating and cooling the tool there is usually provided a pump adapted to take oil or other coolant from a suitable reservoir and force it through suitable pipes or flexible tubing to the tool, thus a flow of coolant may be delivered to the tool continuously during the drilling operation. One of the preferred clamping means for machines of this type is disclosed in United States Patent to Klausmeyer, No. 1,070,815 dated August 19, 1913, in which the clamp is actuated by fluid pressure under the control of a lever located in a position where it is readily accessible to the operator when he is stationed at his work.

Heretofore considerable difficulty has been experienced in the operation of these machine-tools having circularly moving arms due to the fact that current to rotate the motor and fluid pressure to actuate the arm clamp must be introduced into the machine and distributed to the various mechanisms which they are adapted to actuate. It will readily be perceived that with conventional means for these purposes a continued turning of the arm about the column would soon twist the wires running to the motor and likewise twist the usual flexible conductor for the fluid pressure for the arm clamp. Furthermore these power and pipe lines have heretofore been located in positions in which they were more or less in the way of the operator and also of the arm and were therefore a constant source of annoyance. The pipe line for the cutting lubricant also has usually been exposed and subject to the twisting action caused by rotation of the radial arm.

This invention has for an object to provide in a machine-tool improved means for introducing power into the machine and for so distributing it to the various points where it is utilized, that the conveying means for the power will not obstruct or restrict the operation of the machine-tool and will not be in the operator's way. A further object is so to construct a radial drill of the type hereinbefore referred to that the radial arm may be swung about the axis of the column without twisting or otherwise affecting the power lines and the means for supplying cutting lubricant to the tool.

These objects have been attained by so forming the base and post of a machine-tool that the power lines and cutting lubricant may be brought into the machine at the base of the column, led up through the column to the top thereof and then distributed to the various points of use. In this construction there are no exposed pipes or wires which interfere with or obstruct the rotation of the arm. An improved construction and arrangement of the parts also permits the arm and sleeve to be rotated indefinitely without twisting or in anywise affecting the relation of the various lines.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
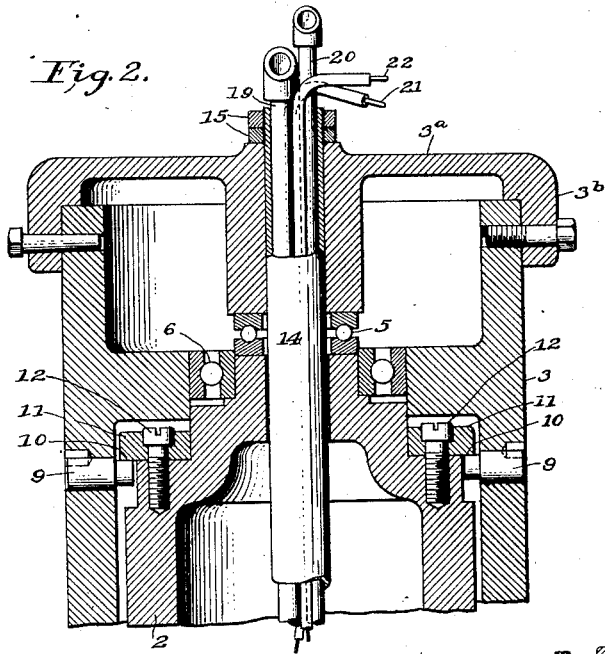
Figure 6:
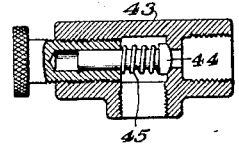
Figure 3:
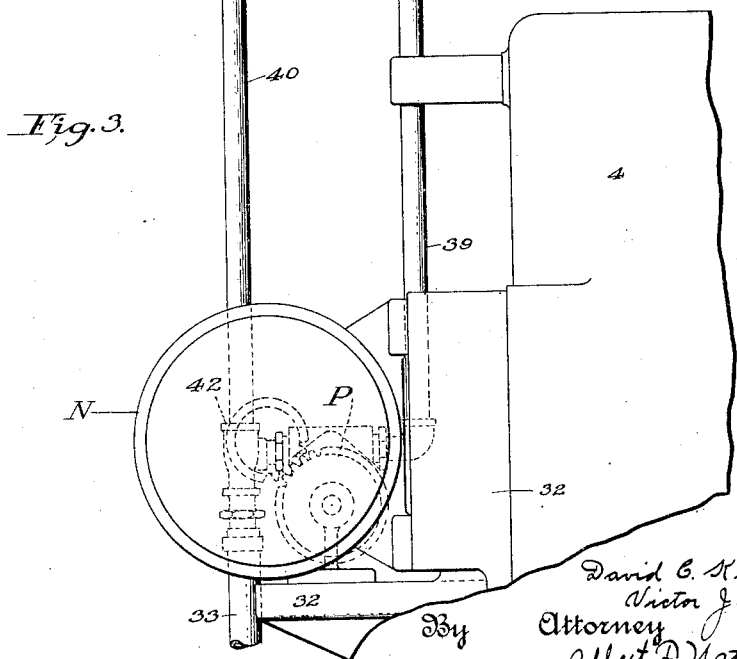

Fig. 1 is an elevation, partly in section, of a portion of a radial drill embodying the present invention. Fig. 2 is a vertical section of the upper end of the sleeve and post and showing the means for holding the power and lubricant pipes, later to be referred to. Fig. 3 is a detail elevation of the means for effecting a flow of cutting lubricant and the relief line which permits the pump to be actuated even when the lubricant discharge nozzle is closed. Fig. 4 is a detail section on the line 4—4 of Fig. 1. Fig. 5, is an enlarged vertical section on the line 5—5 of Fig. 4 showing means for supporting certain air and lubricant pipes and electrical contacts later to be referred to. Fig. 6 is a central section of a pump relief valve shown in Fig. 3. Fig. 7 is a vertical section showing one means for preventing relative rotation between the power-line housing tube and the sleeve. Fig. 8 is a horizontal section on the line 8—8 of Fig. 7. Fig. 9 is an enlarged central vertical section of the rotatable connection showing a slightly modified construction. Fig. 10 is a detail section showing the means for attaching to housing-tube an air and coolant connecting-block later to be referred to. Fig. 11 is a front view of a portion of a radial drill showing the fluid pressure controlled clamping mechanism for clamping the sleeve to the post. Fig. 12 is a view of the lower portion of Fig. 11 looking in the direction of the arrow T in Fig. 11. Figs. 13 and 14 are detail views of portions of the clamp actuating mechanism.

Referring more particularly to the drawings the invention is disclosed in a radial drill comprising a base 1 upon which is mounted a post 2 forming a stationary part of a vertically disposed column designated generally as C. A rotatable sleeve 3 is supported upon the upper end of the post by means of an anti-friction thrust-bearing 5 and is maintained coaxial therewith at its upper end by an anti-friction bearing 6. The lower end of the sleeve is held coaxial with the post 2 by means of its engagement with cylindrical bearing surfaces 7 and 8 provided by the post. The upper end of the sleeve 3 is closed by a wall 3ª which may be formed integral with the sleeve, but for convenience in manufacturing and assembling, it is preferably made as a part of a separate cap 3ᵇ adapted to be secured to the upper end of the sleeve as clearly shown in Fig. 2.

A radial arm 4 is adjustably secured upon the sleeve 3 and carries the usual drill-head, (not shown). Any suitable means may be provided for translating the arm vertically on the sleeve and for locking it in its adjusted position. The sleeve, and its attached arm are adapted to be rotated about the axis of the post 2 and when the arm has been brought to the desired position the sleeve may be locked to the post to prevent further movement of the arm. In the present type of machine-tool this locking is preferably effected by a fluid pressure actuated clamp such as is disclosed in the United States Patent No. 1,070,815, hereinbefore referred to.

To prevent separation of the post and sleeve when, during transportation, the machine-tool is lifted as by means of a rope passed around the column beneath the arm, the sleeve is preferably fitted with one or more studs 9 which project inwardly and engage a shoulder 10 on the post 2. This shoulder may be provided by an annular groove in the periphery of the post, or as shown in Fig. 2 it may be provided by a separate plate or ring 11 secured to the post as by screws 12.

Secured upon an extension 4ª of the arm 4 is a motor M which is operatively connected to drive a horizontal arm shaft 13 from which power may be taken to rotate the drill-spindle and to feed it vertically in the drill-head. Inasmuch as the construction of the drill-head and the means for taking power from the shaft 13 are well understood by those skilled in the art and as they form no part of this invention detailed illustration and description thereof is deemed unnecessary.

As hereinbefore stated, this invention relates particularly to means for introducing power (both electric and fluid pressure) into the machine-tool and for distributing it to the various mechanisms to be actuated thereby, together with improved means for supplying cutting lubricant to the tool, all of which is effected in a novel manner, whereby certain undesirable features of prior machines are eliminated. This is attained by means now to be described.

Secured within the cap 3ᵇ, coaxial with the post 2 and sleeve 3 is a tube 14 held against endwise movement in one direction, by nuts 15 and against movement in the opposite direction by a sleeve 16 secured to the tube 14 adjacent its lower end. The sleeve 16 is provided with an annular flange 17 which abuts the underside of a bearing 18 provided by the post 2. The tube 14 rotates with the sleeve 3 and forms a housing for an air-pressure pipe 19, a lubricant or coolant pipe 20 and electric conductors 21 and 22, the later being adapted to transmit current to the motor M and to a pump-motor N, later to be referred to. Any suitable means may be employed to lock together against relative rotation the sleeve 3 and housing-tube 14. As shown in Figs. 7 and 8 this may be effected by forming slots $14^a$ and $14^b$ in the opposite sides of the tube and then securing key-blocks $14^c$ and $14^d$ to the upper end of the sleeve with the inner ends of said blocks extending into said slots. The key-blocks may be secured to the upper end of the sleeve 3 as by screws $14^e$. The lower ends of the conductors 21 and 22 are connected with annular contact-members 23 and 24 respectively, supported and insulated from each other by a disk 25 of fiber or other non-conducting material fixed to the lower end of the tube 14. An electric current is brought into the column by means of wires 26 and 27 extending through a portal 28 in the base of the post 2. These wires are connected with contact brushes 29 and 30 respectively, supported by a bracket 31 secured to the base of the post. These brushes are held in contact with the annular members 23 and 24 and therefore a complete electrical connection is maintained between the wires 26 and 27 and the motors M and N in all of the adjusted positions of the arm and sleeve about the axis of the post 2.

Beneath the column C the base 1 is formed with a reservoir or sump R adapted to hold suitable cutting lubricant. The lubricant is drawn from the reservoir by a pump P mounted on a bracket 32 carried by the arm. This bracket also serves as a support for the motor N connected to operate the pump P. While the pump P is shown and described as being driven by the motor N it is to be understood that it may conveniently be driven from the arm-shaft 13 and when this latter drive is utilized the motor N is eliminated. To the intake side of the pump is connected one end of a flexible pipe 33 of which the other end is connected with the upper end of the pipe 20 extending through the tube 14. The lower end of the pipe 20 is connected with an outwardly and downwardly extending pipe 34 which carries at its lower end a strainer 35 maintained below the level of the oil in the sump R. The base 1 is formed, coaxial with the post 2, with an aperture 36 surrounded by a vertically disposed cylindrical wall 37 projecting upwardly substantially above the oil level. This aperture affords means to permit the introduction of an air pipe 38 coaxial with the column as will later be described. The pipe 34, due to its angular position, causes the strainer to enter the sump eccentric to the axis of the column and outside of the cylindrical wall 37. Thus as the sleeve 3 and tube 14 are rotated about the axis of the post the strainer will describe a circle about the wall 37 and therefore will not interfere with the air-pipe 38.

The pump P is also connected with a discharge pipe 39 which extends to the drill-head and which may, by a suitable nozzle (not shown), deliver the cutting lubricant to the tool. The discharge pipe is preferably made up of a plurality of sections suitably connected together in a manner permitting the drill-head to be moved lengthwise of the arm 4. To permit a continuous running of the pump even when the flow of lubricant is cut off at the nozzle, there is provided a return line 40 which is connected at 41 with the discharge line 39 and at 42 with the intake side of the pump. This return line is provided with a relief valve 43 of conventional form which, during the normal operation of the machine, that is when the discharge nozzle is open, prevents the flow of lubricant through the return pipe. However, when the lubricant is turned off at the work pressure builds up in the discharge pipe and forces open a normally closed spring-pressed seal 44 thus permitting a continuous circulation of oil through the pump, out through the first section of the discharge pipe and thence through the return pipe 40 back to the intake side of the pump. When the lubricant is again turned on at the work the pressure in the line is reduced and the spring 45 closes the seal 44 which prevents circulation through the return pipe. The excess lubricant delivered to the tool flows downwardly to the base and is collected in suitable oil grooves $g$ which conduct it back toward the column. One or more transverse grooves $t$ are provided to lead the oil from the grooves $g$ back into the sump R from whence it started its circulation. Adjacent the strainer 35 the pipe 34 is fitted with a suitable check-valve 46 which prevents the oil from flowing from the pipe 20 back into the reservoir when the pump is stopped.

As hereinbefore stated the sleeve 3 may be clamped to the post 2 by means of a fluid pressure clamping device such as disclosed in United States Patent No. 1,070,815. Fluid pressure to actuate this clamp is preferably brought into the machine-tool through a pipe $46^x$ which enters the base 1 through an aperture 47 beneath the sump. The pipe $46^x$ is provided with an upwardly extending portion 38 which passes through the aperture 36 coaxial with the post 2 and which is connected, by means of a rotatable coupling 49, with the pipe 19 fixed within the rotatable tube 14. This rotatable coupling permits the pipe 19 to rotate with the sleeve relatively to the pipe 38. The upper end of the pipe 19 is connected by means of a flexible tube 50, with the clamp actuating means hereinbefore referred to. It is to be understood that the wires 26 and 27 and the pipe 46ˣ may extend downwardly through the floor upon which the base is mounted or that they may be covered in any suitable way so as to not interfere with the operator.

The clamping means, adapted to be actuated by fluid pressure through the pipe 19 and tube 50, is clearly shown in Figs. 11, 12, 13 and 14. The lower end of the sleeve 3 is split vertically and horizontally at $3^a$ and $3^b$ respectively, thereby providing yielding portions $3^c$ and $3^d$ adapted to be contracted to cause them to bind upon the post 2. The portions $3^c$ and $3^d$ carry projecting lugs $3^e$ and $3^f$ respectively and within the lug $3^f$ is journaled the lower end of a vertically disposed rod 80 upon which is secured an eccentric 81. A draw bolt 82 is formed at one end with a strap which surrounds the eccentric and the other end of the bolt passes through a suitable aperture in the lug $3^e$ and carries nuts 83. Thus, it will be seen that rotation of the shaft 80 and eccentric 81 will cause the bolt 82 to be drawn endwise thereby drawing the flexible portions $3^c$ and $3^d$ toward each other and causing the sleeve to grip the post. The shaft 80 may be rotated either manually by a hand lever 84 or by means of a fluid pressure actuated means which receives its power through the fluid pressure line including the pipe 19 and tube 50. Splined to the shaft 80, and movable vertically with the arm 4, is a gear segment 85 which meshes with the teeth of a rack-bar 86 attached to and movable with a piston rod 87. This rod 87 is slidingly fitted within a cylinder 88 supported by the arm and carries within the cylinder a piston 89. Fluid under pressure passes through the tube 50 and is controlled by a valve 90. By manipulation of the valve 90 the tube 50 selectively may be connected, through pipes 91 and 92, with the cylinder 88 at opposite sides of the piston 89. From the foregoing it will be perceived that by suitable manipulation of the valve 90 fluid pressure may be admitted into one end of the cylinder thereby causing the piston to be moved toward the opposite end and, through the rack 86 and segment 85, cause rotation of the shaft in a direction to effect clamping of the sleeve. Likewise fluid pressure may be admitted into the other end of the cylinder to reverse the movement of the parts thereby to release the clamp.

Figs. 9 and 10 show a modified construction for maintaining the tube 14 coaxial with the sleeve 3 and for supporting the rotatable electrical connector upon the tube. In this arrangement the lower end of the tube is journaled in a bearing-sleeve 60 fixed to the bearing 18, as by screws 61. Within the lower end of the tube 14 is secured a block 62 into which the pipes 19 and 20 are threaded. The pipes 38 and 34 also connect with the block 62 and are connected with the pipes 19 and 20 respectively by passageways 63 and 64. Secured to the block 62 is a sleeve 65 having a flange 66 which supports the disk 25. Screws 67 threaded into the flange 66 enter apertures 68 in the disk 25 and thereby transmit to the latter rotary movements of the tube 14. A spacing sleeve 68 surrounds the tube 14 intermediate the sleeve 60 and the disk 25. This sleeve 68 is preferably provided with apertures as 69 through which the connectors 21 and 22 may be brought for attachment to the annular contact members 23 and 24.

From the foregoing it will be perceived that there has been provided a novel construction and arrangement by means of which power to operate the various mechanisms of the machine-tool is brought thereinto and distributed to its points of use without in any way interfering with the operator and which also permits the arm to be rotated about the axis of the post without twisting or otherwise affecting the power lines. This construction also combines with the arrangement of the power lines a new and improved means for continuously lubricating and cooling the drill.

Without further analysis, the foregoing will so fully reveal the gist of this invention that others can, by applying current knowledge, readily adapt it for variouus utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of the United States:

1. A radial-drill combining a base; a post; a sleeve rotatably mounted on said post; an arm supported by said sleeve; fluid actuated means carried by said arm for clamping said sleeve to said post; a shaft extending lengthwise of said arm; a motor supported by the arm operatively connected to rotate said shaft; a lubricant pump carried by the arm; a motor carried by the arm operatively connected to drive said pump; fluid, lubricant and electrical conductors extending upwardly through said post and connected with said clamp, pump and motors respectively and so arranged as not to become twisted upon rotation of said sleeve; and means adjacent the lower end of the post connecting each of said conductors with a source of supply.

2. In a radial-drill a base; a post supported thereon; a sleeve rotatable on said post; a fluid pressure delivery pipe and an electrical conductor extending vertically through said post and rotatable with said sleeve; means adjacent the base for supplying an electric current to said electrical conductor, said means including a rotatable contact; and means for supplying fluid pressure to said fluid pressure pipe, said last named means comprising a non-rotatable fluid pressure supply pipe and a rotatable coupling connecting said supply pipe with said fluid pressure delivery pipe.

3. A radial-drill as set forth in claim 1, characterized by this, that the conductors extend upwardly through and rotate with a tube extending substantially the full length of the post and supported by the sleeve and maintained coaxial with the post.

4. A radial-drill combining a base; a post secured upon the base; a sleeve rotatably mounted on said post; a fluid actuated clamp for securing said sleeve to said post; an arm carried by said sleeve; a motor supported by said arm; an electrical conductor and a fluid pressuse line entertng said post adjacent the base; and means operatively connected with said electrical conductor and fluid pressure line for transmitting electrical current and fluid pressure up through said post and then to said motor and clamp respectively, said means each including a rotatable connection located within said post adjacent said base and of which one part is stationary with said base and another part is rotatable with said sleeve.

5. In a radial-drill, a base provided with a reservoir and a vertical aperture; a post secured upon said base with its axis substantially in line with said aperture; a lubricant pipe extending upwardly through said post adjacent the axis thereof, said pipe being provided with an off-set end entering said reservoir at one side of said aperture; and means permitting said off-set end to be rotated horizontally in said reservoir about said vertical aperture.

6. In a radial-drill, a base provided with a reservoir and a vertical aperture; a post secured upon said base with its axis substantially in line with said aperture; a fluid pressure pipe extending through said aperture and upwardly through said post; a lubricant pipe extending through said post adjacent said fluid pressure pipe and having an off-set end entering said reservoir at one side of said aperture; and means permitting said off-set end to be rotated horizontally in said reservoir about said aperture and said fluid pressure pipe extending therethrough.

7. In a radial-drill, a base provided with a reservoir and a vertical aperture; a post secured upon said base with its axis substantially in line with said aperture; a non-rotatable fluid pressure pipe having a portion in line with said aperture; a second fluid pressure pipe rotatably supported lengthwise within said post; a rotatable connection between said pipes; a lubricant pipe extending through said post adjacent said second fluid pressure pipe and having an off-set end entering said reservoir at one side of said aperture; and means permitting said lubricant pipe and its off-set end to be rotated about said fluid pressure line.

8. In a radial-drill, a base provided with a reservoir and a vertical aperture; a post secured to said base with its axis substantially in line with said aperture and provided adjacent its lower end with a portal; a fluid pressure line extending through said aperture and upwardly through said post; a lubricant conduit extending lengthwise through said post and having its lower end entering said reservoir; an electrical conductor extending vertically through said post and connected at its lower end to one portion of a rotatable electrical contact; and an electrical conductor extending through said portal and operatively connected with another portion of said rotatable contact; and means permitting a continued rotation of said lubricant conduit about said fluid pressure line.

9. In a radial-drill, a base; a post secured thereto; a reservoir formed in said base; a sleeve rotatably mounted on said post; a tube secured to said sleeve adjacent its upper end and extending downwardly within said post coaxial therewith; lubricant pipe and a plurality of power conductors extending through said tube; means adjacent the lower end of the tube for connecting each of said power conductors with a source of power, said means each including a rotatable connection; means to connect said lubricant pipe with said reservoir and including an off-set portion entering said reservoir at one side of one of said power conductors; and means for connecting the upper ends of said conductors with devices adapted to be actuated by the power flowing therethrough and for conducting the lubricant from said lubricant pipe to the usual drill point.

10. In a radial drill, a base; a post secured thereto and provided adjacent its lower end with a portal; a sleeve rotatably supported on said post; an arm carried by said sleeve; a vertically disposed tube secured to said sleeve and rotatably journaled within said post and extending substantially the full length of said post; a plurality of electrical conductors extending through said tube; a plurality of annular electrical contact-members carried by the lower end of said tube one of which is connected with each of said conductors; a bracket removably supported by said post and extending through said portal; a plurality of electrical conductors entering said post through said portal; and a pair of contact brushes carried by said bracket and each connected with one of said last-named conductors and maintained in contact with said annular members to effect a complete electric circuit through said post in all of the horizontal positions of said sleeve about said post.

11. In a radial-drill, a base provided with a reservoir; a post secured thereto; a sleeve rotatably mounted on said post; a clamp to secure said sleeve to said post; an arm carried by said sleeve; a shaft extending lengthwise of said arm; a motor operatively connected to drive said shaft; a lubricant pump; a motor operatively connected to drive said pump; fluid-actuated clamp controlling means, said motors, pump and clamp controlling means being carried by said arm and rotatable therewith; an electrical conductor extending upwardly through said post and connected to said motors; a fluid pressure line extending upwardly through said post and connected with said clamp; a lubricant conduit entering said reservoir and extending upwardly through said post and connected with said pump; and means to maintain said electrical conductor, fluid pressure line and lubricant conduit substantiall coaxial with said post and to cause them to rotate with said sleeve.

12. A radial-drill combining a base provided with a reservoir; a post secured to said base; a sleeve rotatably supported on said post; a plurality of power lines and a lubricant conduit extending longitudinally through said post and rotatable with said sleeve; non-rotatable means adjacent the lower ends thereof for supplying power to said power lines and for supplying lubricant to said conduit from said reservoir, and means to maintain said power lines and conduit substantially coaxial with said post and for preventing twisting thereof during the rotation of said sleeve.

13. In a radial drill, an upright column provided adjacent its lower end with a portal; a radial arm rotatably carried by said column; annular electrical contact members located within said column adjacent said portal and rotatable with said arm; a motor mounted on said arm; an electrical conductor connected to said motor and extending downwardly through said column and connected to said annular contact members; a bracket removably attached to said column and projecting through said portal; contact brushes carried by said bracket and maintained in contact with said annular contact members; and electrical conductors extending through said portal and attached to said brushes.

14. In a radial-drill, an upright post; a sleeve rotatably mounted thereon; a fluid pressure actuated clamp rotatable with said sleeve for locking together said post and sleeve; a radial arm carried by said sleeve; a motor carried by said arm; a non-rotatable electrical conductor and a non-rotatable fluid pressure conveyor entering said post adjacent its lower end; an electrical conductor and a fluid pressure conductor emerging from said sleeve adjacent its upper end and connected with said motor and clamp respectively and adapted to partake of rotary movements with said sleeve; and rotatable connections within said post for connecting together respectively said electrical conductors and said fluid pressure conveyors.

15. In a radial drill, a column; an arm rotatably supported by said column; a fluid actuated device and an electrically actuated device exteriorly of said column and rotatable with said arm; means for supplying power to said devices, said means comprising fluid pressure line and an electric power line entering said column adjacent its lower end, extending upwardly through the column and emerging adjacent its upper end and then connected to said fluid pressure and electrically actuated devices respectively; and a lubricating system comprising a reservoir beneath said column, and a lubricant pipe extending upwardly through said column and located eccentrically to said fluid pressure line and having a portion entering said reservoir, said reservoir pipe being arranged to permit of its rotation about said fluid pressure line.

16. In a radial-drill, a base provided with a reservoir; a post secured to the base above said reservoir; a sleeve rotatably mounted on said post; a tube connected to said sleeve and extending coaxially through said sleeve and post substantially the entire length of said sleeve; and power conveying means and a lubricant pipe entering said reservoir extending through said tube and rotatable with said tube and sleeve.

17. In a radial-drill, a base provided with a coolant reservoir; a post secured to said base; a sleeve rotatably supported on said post; a coolant conduit rotatable with said sleeve and extending from said reservoir upwardly through said post substantially coaxially therewith; and out through the top thereof; a pump rotatable with said sleeve connected with said conduit and adapted to draw coolant therethrough and to deliver it to the usual drill-point; and means to return the used coolant to the reservoir.

18. In a radial-drill, a base provided with a coolant reservoir; a post secured to said base; a sleeve rotatably journaled on said post; a tube extending coaxially through said post and sleeve and rotatable therewith; electrical conductors and a fluid pressure line entering said post adjacent its lower end and extending through said tube and rotatable therewith; a coolant conduit rotatable with said sleeve and extending from said reservoir upwardly through said tube; electrically actuated means and fluid pressure means, rotatable with said sleeve to which said conductors and pressure line are connected respectively; and a pump operatively connected with said conduit.

In witness whereof, we have hereunto subscribed our names.

DAVID C. KLAUSMEYER.
VICTOR JULIEN.